(12) United States Patent
Tomatsu

(10) Patent No.: US 7,458,738 B2
(45) Date of Patent: Dec. 2, 2008

(54) IMAGE-TAKING APPARATUS

(75) Inventor: Kei Tomatsu, Shiki (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 11/198,540

(22) Filed: Aug. 5, 2005

(65) Prior Publication Data

US 2006/0029384 A1    Feb. 9, 2006

(30) Foreign Application Priority Data

Aug. 5, 2004  (JP) ............................. 2004-229876

(51) Int. Cl.
*G03B 17/00*  (2006.01)
(52) U.S. Cl. .................. 396/447; 396/449; 396/479; 396/480
(58) Field of Classification Search ............... 396/447, 396/449, 479, 480
See application file for complete search history.

(56) References Cited

U.S. PATENT DOCUMENTS

| | | | | |
|---|---|---|---|---|
| 5,153,783 A | * | 10/1992 | Tamada et al. | 386/117 |
| 5,452,048 A | * | 9/1995 | Edgar | 396/180 |
| 6,714,734 B2 | * | 3/2004 | Muramatsu | 396/157 |
| 6,734,895 B1 | * | 5/2004 | Uehara et al. | 348/79 |
| 6,765,618 B1 | | 7/2004 | Sato | |
| 2004/0052515 A1 | * | 3/2004 | Nishida et al. | 396/155 |
| 2005/0057660 A1 | * | 3/2005 | Nonaka et al. | 348/208.99 |
| 2006/0275026 A1 | * | 12/2006 | Oikawa | 396/111 |

FOREIGN PATENT DOCUMENTS

JP        2000-121922 A      4/2000

* cited by examiner

*Primary Examiner*—W. B. Perkey
*Assistant Examiner*—Warren K Fenwick
(74) *Attorney, Agent, or Firm*—Cowan, Liebowitz & Latman, P.C.

(57) ABSTRACT

An image-taking apparatus is disclosed which allows preparatory driving for the next image-taking without degrading image quality and a reduction in time taken for one image-taking operation. The image-taking apparatus has a controller which controls an actuator which drives an operation mechanism which performs a first operation for allowing the image-taking with a photoelectrical conversion device and then a second operation (preparatory driving) for returning to the state before the first operation. The controller starts to drive the actuator for causing the operation mechanism to perform the second operation after the start of the travel of a rear curtain of a shutter and before the end thereof during accumulation of charge on the photoelectrical conversion device, or before reading of charge from the photoelectrical conversion device after the completion of exposure of the photoelectrical conversion device.

17 Claims, 6 Drawing Sheets

IMAGE-TAKING APPARATUS

BACKGROUND OF THE INVENTION

The present invention relates to an image-taking apparatus such as a digital camera which takes images with a photoelectrical conversion element.

Known image-taking apparatuses as mentioned above include a digital camera of a single-lens reflex type which splits luminous flux for taking images through a quick return mirror into two, each for a viewfinder optical system and an image-pickup device (a photoelectrical conversion device). FIG. 5 shows an operational sequence of a conventional single-lens reflex digital camera.

In FIG. 5, when a release switch of the digital camera is pressed, a sequence motor is rotated while current is applied to a front curtain magnet and a rear curtain magnet of a shutter. The rotation of the sequence motor causes a quick return mirror to be moved upward and the mechanical lock of the shutter is released. Even after the mechanical lock of the shutter is released, a front curtain and a rear curtain of the shutter are held by the magnets.

When the sequence motor is rotated by a predetermined amount to complete the abovementioned operation, the sequence motor is stopped and an image-pickup device discharges unnecessary accumulated charge to start accumulating charge for taking images.

The quick return mirror bounds against a stopper at an up position (a position to which it is moved out of an image-taking optical path). To wait for the bound to stop, the current application to the front curtain magnet is stopped and the front curtain starts traveling after the elapse of a predetermined time period (time T77 in FIG. 5).

After the elapse of an exposure time set by an operator or automatically set by the camera from the start of the travel of the front curtain, the current application to the rear curtain is stopped and the rear curtain starts traveling. When the rear curtain completes the travel, the image-pickup device stops the accumulation of charge to start reading the charge.

After the reading of the charge is finished, the sequence motor is rotated again to perform preparatory driving for the next image-taking (driving for moving the mirror down and driving for shutter charge). When the driving for moving the mirror down is completed, luminous flux for taking images is directed to a photometric sensor and an AF sensor in the camera.

In recent cameras, image-pickup devices have higher resolution in order to take images with higher resolution. The higher resolution of the image-pickup device tends to increase the time taken for reading charge from the image-pickup device. The increased time for reading charge results in the problem of taking a longer time for one image-taking operation to reduce the speed in taking images.

As a solution for the problem, it is contemplated that preparatory driving for the next image-taking is started during charge reading (for example, see Japanese Patent Laid-Open No. 2000-50137). The preparatory driving for the next image-taking started during charge reading in the current image-taking operation can reduce the time taken for one image-taking operation.

When the preparatory driving for the next image-taking is started during charge reading, however, the starting current of a motor serving as a driving source for performing the preparatory driving sharply reduces the supply voltage. This leads to noise produced when the read charge is converted into voltage, which causes degraded image quality.

In conventional silver salt cameras, performing the preparatory driving for the next image-taking while a film is exposed to light of a subject image has been difficult in view of driving of a film transport system. In digital cameras, based on such convention, the preparatory driving for the next image-taking is typically performed after charge is read from an image-pickup device in an image-taking sequence.

BRIEF SUMMARY OF THE INVENTION

It is an object of the present invention to provide an image-taking apparatus which allows preparatory driving for the next image-taking without degrading image quality and a reduction in time taken for one image-taking operation.

According to one aspect, the present invention provides an image-taking apparatus which takes images with a photoelectrical conversion device, and has a controller which controls an actuator which drives an operation mechanism which performs a first operation for allowing the image-taking and then a second operation (preparatory driving) for returning to the state before the first operation and a shutter which controls an amount of exposure light applied to the photoelectrical conversion element by travel of a front curtain and a rear curtain. The controller starts driving the actuator for causing the operation mechanism to perform the second operation after the start of the travel of the rear curtain and before the end thereof during accumulation of charge on the photoelectrical conversion device.

According to another aspect, the present invention provides an image-taking apparatus which takes images with a photoelectrical conversion device, and has a controller which controls an actuator which drives an operation mechanism which performs a first operation for allowing the image-taking and then a second operation for returning to the state before the first operation. The controller starts driving the actuator for causing the operation mechanism to perform the second operation before reading of charge from the photoelectrical conversion device.

According to another aspect, the present invention provides a processing program executed by a computer in an image-taking apparatus which has a photoelectrical conversion device and a shutter controlling an amount of exposure light applied to the photoelectrical conversion element by travel of a front curtain and a rear curtain. The processing program has the steps of an image-taking step of taking images with the photoelectrical conversion device, and a control step of controlling an actuator which drives an operation mechanism which performs a first operation for allowing the image-taking and then a second operation for returning to the state before the first operation. In the control step, the driving of the actuator for causing the operation mechanism to perform the second operation is started after the start of the travel of the rear curtain and before the end thereof during accumulation of charge on the photoelectrical conversion device.

According to still another aspect, the present invention provides a processing program executed by a computer in an image-taking apparatus which has a photoelectrical conversion device. The processing program has the steps of an image-taking step of taking images with the photoelectrical conversion device, and a control step of controlling an actuator which drives an operation mechanism which performs a first operation for allowing the image-taking and then a second operation for returning to the state before the first operation. In the control step, the driving of the actuator for causing the operation mechanism to perform the second operation is started before reading of charge from the photoelectrical conversion device.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
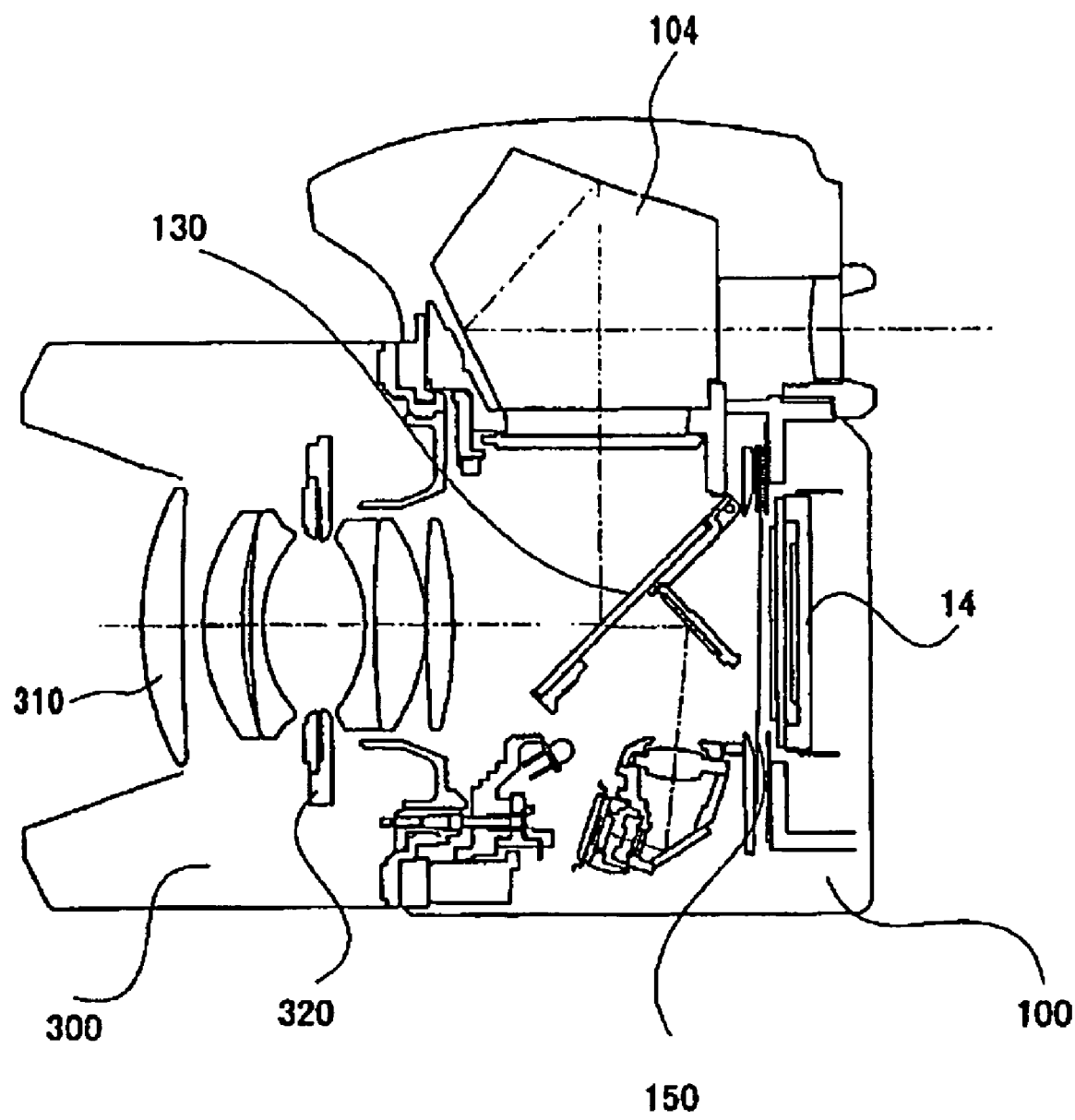
FIG. 1 schematically shows the structure of a digital camera system according to an embodiment of the present invention.
Figure 2:
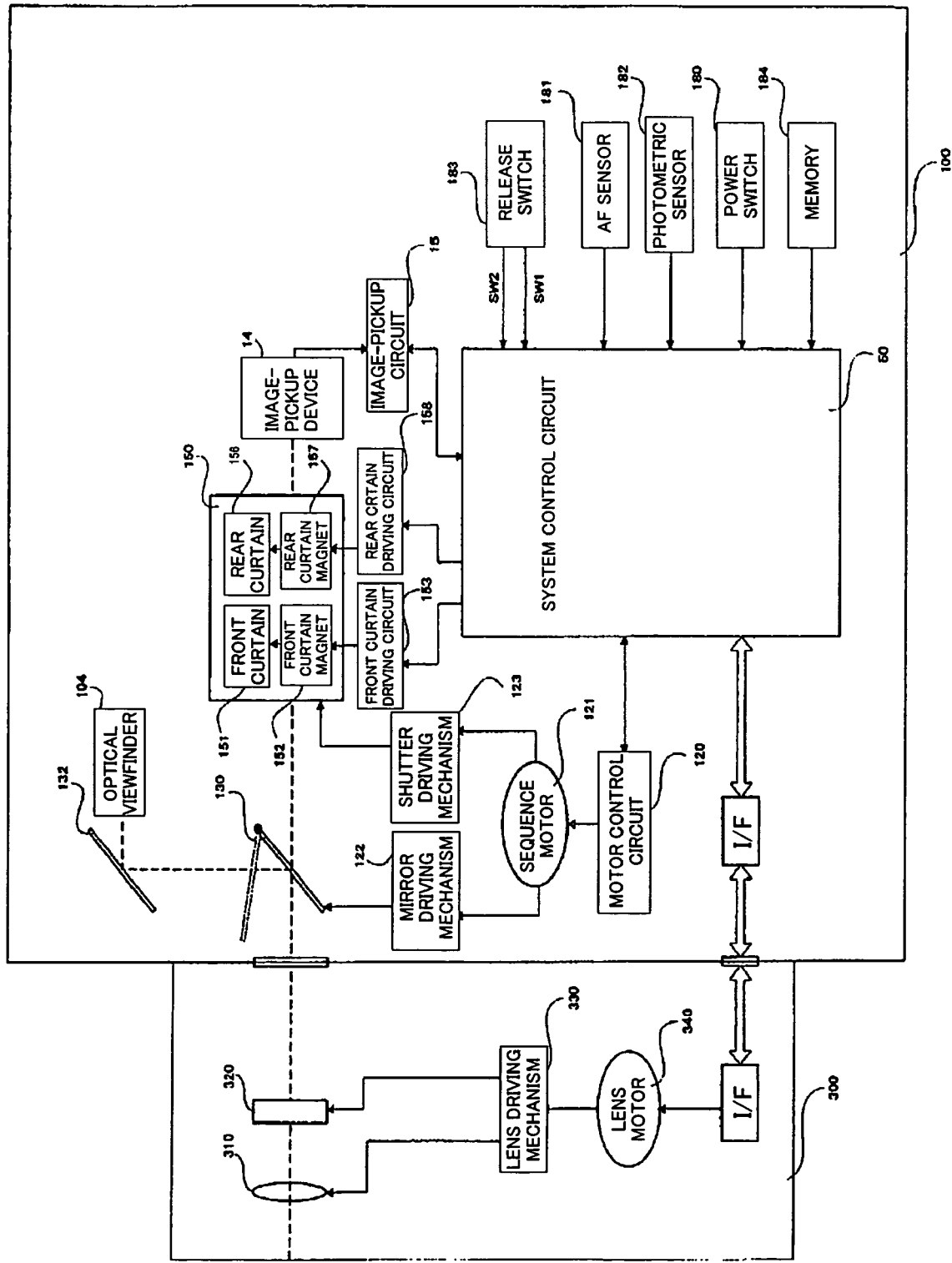
FIG. 2 is a block diagram showing the electrical feature of the digital camera system of the embodiment.

FIG. 1 schematically shows the structure of a digital camera system according to Embodiment 1 of the present invention. FIG. 2 shows the digital camera system mainly focused on its electrical features.

In FIGS. 1 and 2, reference numeral 100 shows a camera body serving as an image-taking apparatus. Reference numeral 300 shows an interchangeable lens unit mountable on the camera body 100. The interchangeable lens unit 300 is provided with a lens 310 and a stop 320 which are driven by a lens motor 330 shown in FIG. 2.

Reference numeral 14 shows an image-pickup device serving as a photoelectrical conversion device which photoelectrically converts a subject image formed by the interchangeable lens unit 300 and accumulates charge, and is realized by a CCD sensor, a CMOS sensor, or the like. Reference numeral 150 shows a shutter which controls the amount of exposure light applied to the image-pickup device 14. Reference numeral 130 shows a mirror which is disposed on an optical path of luminous flux from the interchangeable lens unit 300 and can be pivoted between a down position at which it directs the luminous flux toward an optical viewfinder 104 through a guide mirror 132 (see FIG. 2) and an up position at which it is moved out of the optical path.

The luminous flux from a subject incident on the lens 310 is formed into an image on the image-pickup device 14 through the aperture of the stop 320, the mirror 130, and the shutter 150.

In FIG. 2, reference numeral 50 shows a system control circuit which performs control of the overall camera system. The system control circuit 50 provides the image-pickup device 14 with a driving pulse for reading charge. A signal read from the image-pickup device 14 is processed by an image-pickup circuit 15 which performs white balance processing and A/D conversion for conversion into image data which is input to the system control circuit 50.

The system control circuit 50 also controls a sequence motor 121 through a motor driving circuit 120 and a lens motor 340. The sequence motor 121 is rotated to drive a mirror driving mechanism 122 including the mirror 130 and a shutter driving mechanism 123 including the shutter 150 in a predetermined order. The lens motor 340 is rotated to drive a lens driving mechanism (a stop mechanism) 330 including the stop 320 and the lens 310.

The mirror driving mechanism 122 pivots the mirror 130 between the down position and the up position shown by a broken line. The shutter driving mechanism 123 holds a front curtain 151 and a rear curtain 156 of the shutter (the focal-plane shutter) 150 through mechanical engagement with an engagement mechanism, not shown, at predetermined positions before travel, and performs shutter charge operation of returning the front curtain 151 and the rear curtain 156 to the predetermined positions after travel.

The front curtain 151 and the rear curtain 156 are provided with a front curtain magnet 152 and a rear curtain magnet 157, respectively, for holding them through magnetic force while the holding of them though mechanical engagement at the predetermined positions is released. The system control circuit 50 controls current supply to the front curtain magnet 152 and the rear curtain magnet 157 through a front curtain driving circuit 153 and a rear curtain driving circuit 158, respectively. The currents applied to the front curtain magnet 152 and the rear curtain magnet 157 which hold the front curtain 151 and the rear curtain 156 with the magnetic force, respectively, are stopped to cause the front curtain 151 and the rear curtain 156 to travel with urging force of a spring, not shown.

In addition, the system control circuit 50 is connected to a power switch 180, an AF (auto-focus) sensor 181 for performing AF processing, a photometric sensor 182 for performing AE (auto-exposure) processing, a release switch (SW1, SW2) 183, a memory 184 for storing a control program and data, and the like.

Figure 3:
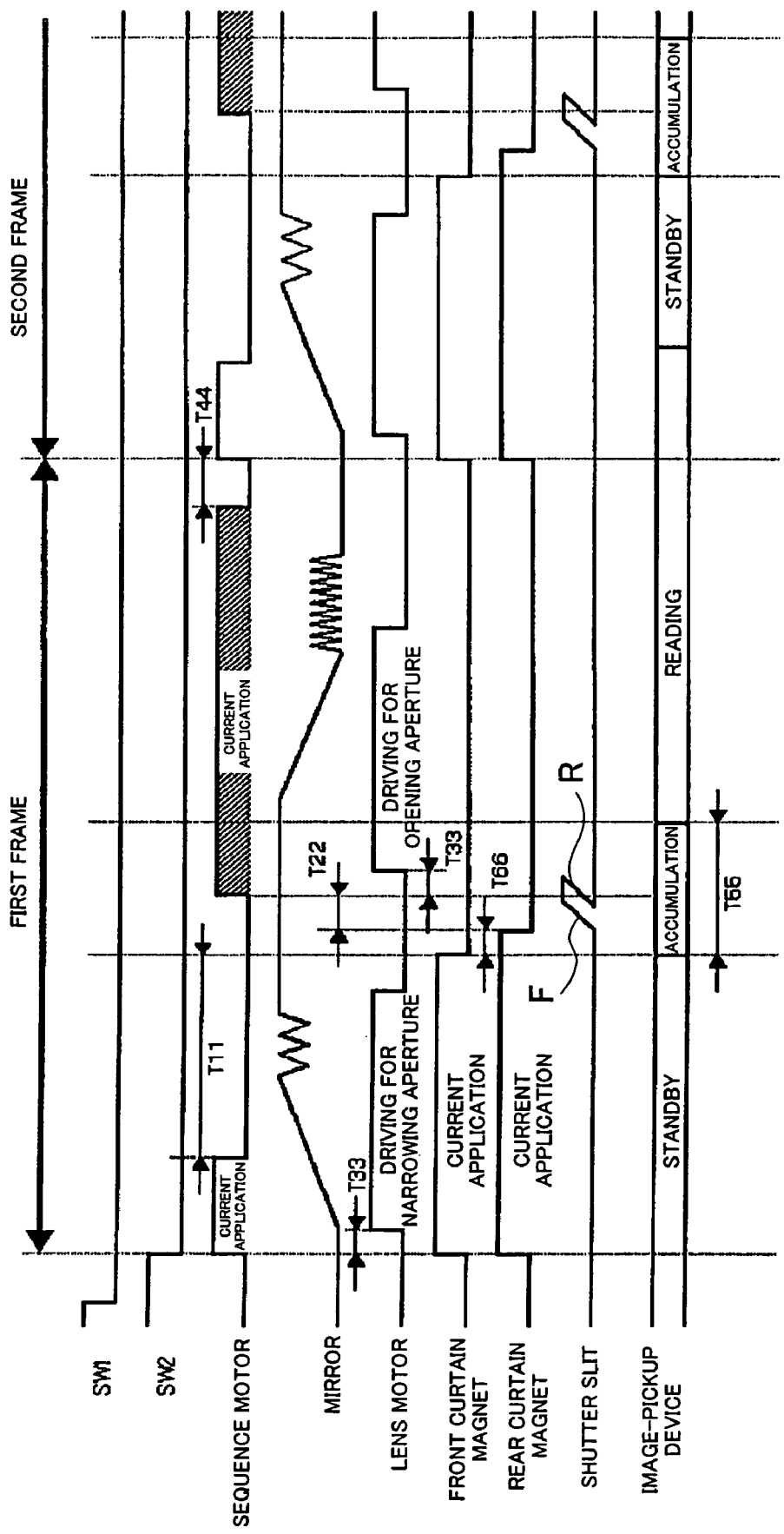
FIG. 3 is a timing chart showing the operation of the digital camera system of the embodiment.
Figure 4A:
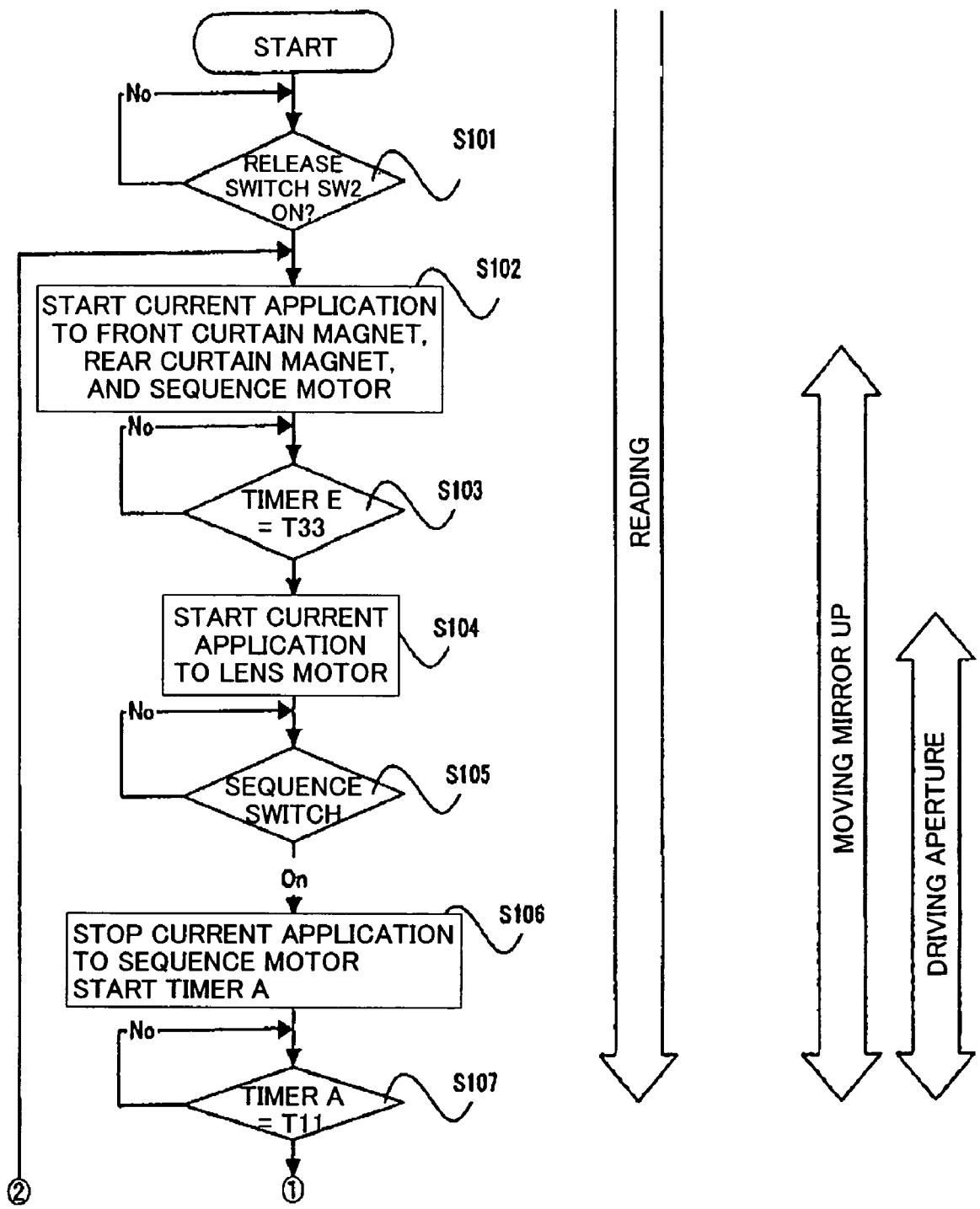
FIG. 4A is a flow chart showing the operation of the digital camera system of the embodiment.
Figure 4B:
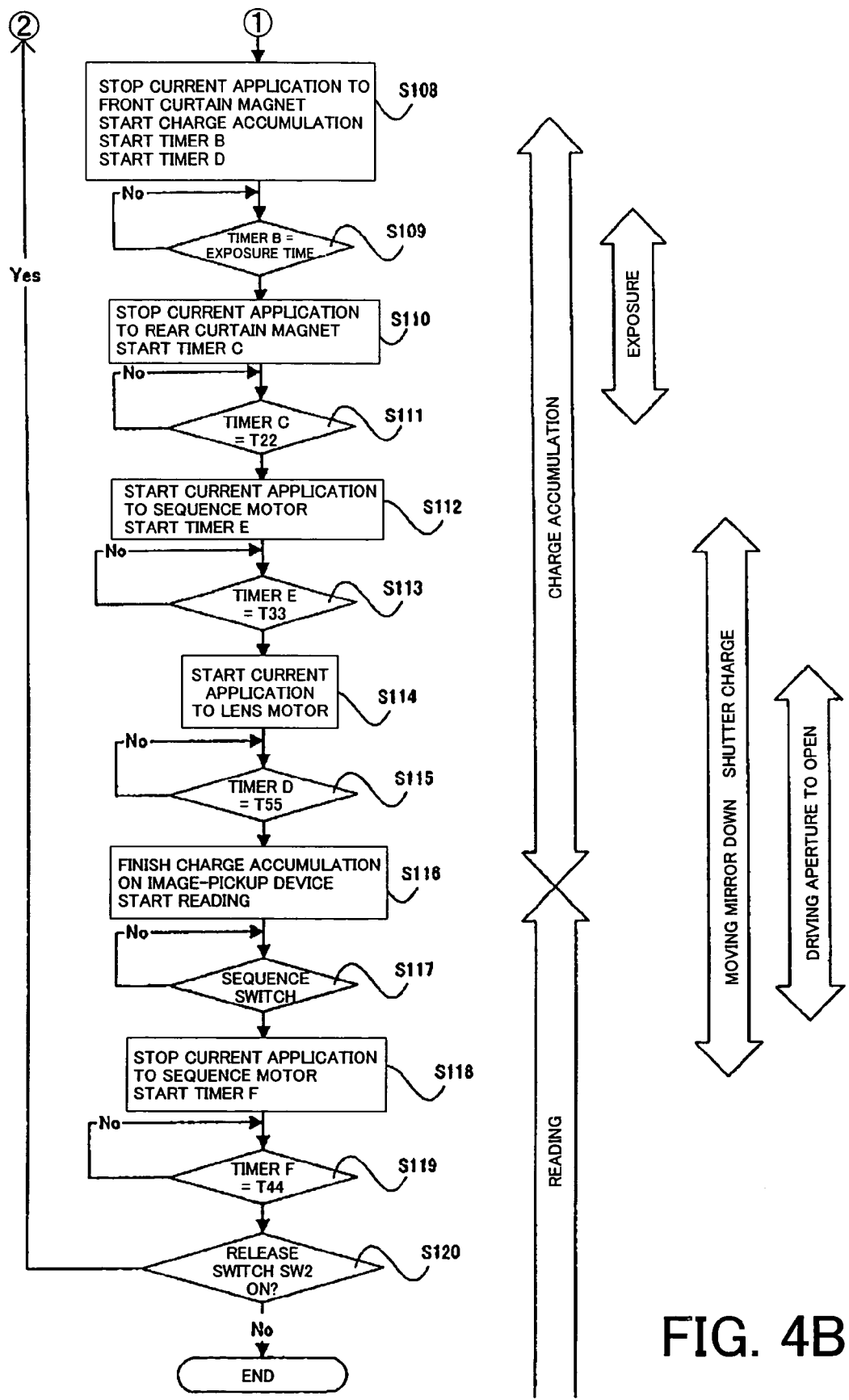
FIG. 4B is a flow chart showing the operation of the digital camera system of the embodiment, following the flow chart in FIG. 4A.
Figure 5:
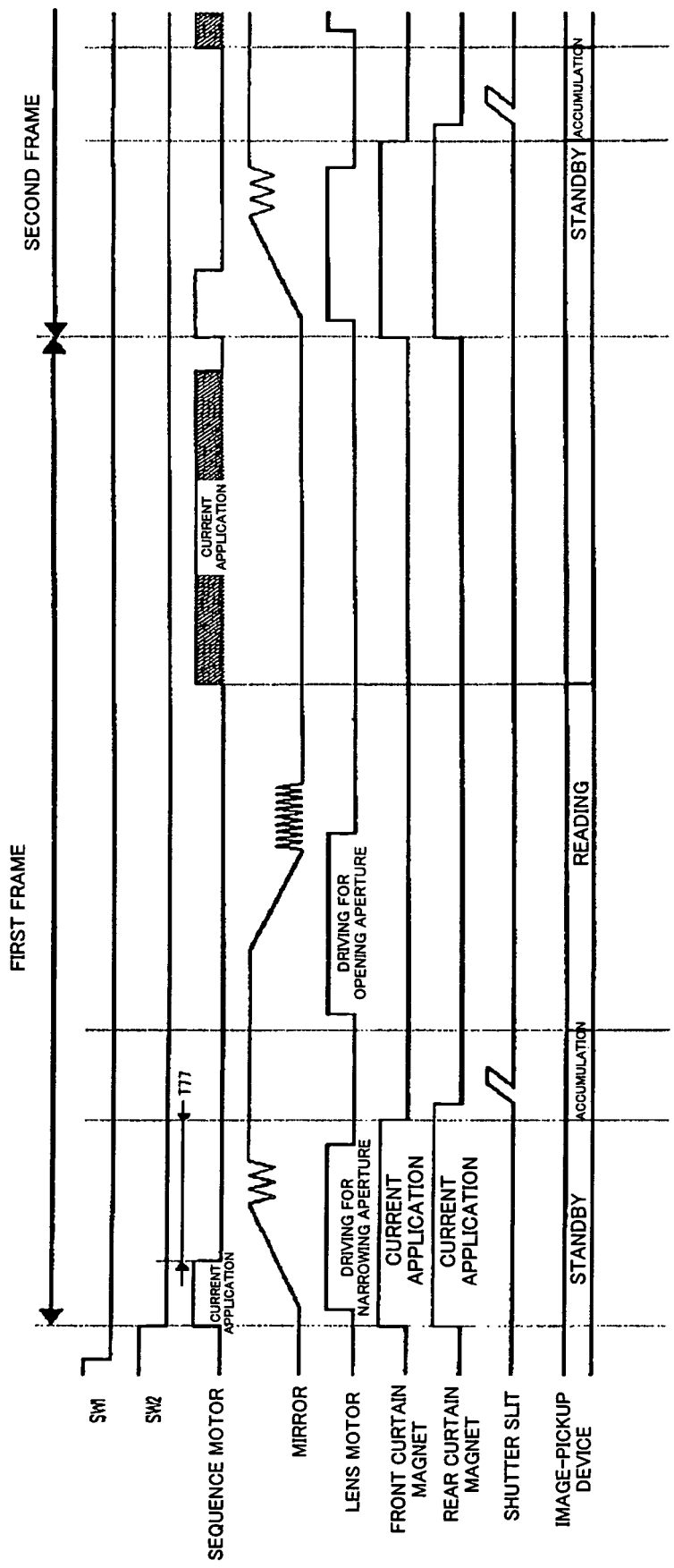
FIG. 5 is a timing chart showing the operation of a conventional digital camera system.

FIG. 3 shows the operation timing of the digital camera system of Embodiment 1. FIGS. 4A and 4B are flow charts showing the operation of the digital camera system (mainly the system control circuit 50) of Embodiment 1. Description will be made of the operation of the digital camera system with reference to FIGS. 3, 4A, and 4B. The operation is performed in accordance with a processing program stored in the memory 184.

The system control circuit 50 first determines whether or not the release switch 183 is fully pressed (SW2 is ON) (S101). When the release switch 183 is fully pressed, the system control circuit 50 starts applying current to the front curtain magnet 152 and the rear curtain magnet 157 and starts applying current to the sequence motor 121, that is, driving the sequence motor 1.21 (S102).

The rotation of the sequence motor 121 causes the mirror driving mechanism 122 to move the mirror 130 upward to the up position from the down position (a first operation of the mirror driving mechanism 122). On the other hand, the shutter driving mechanism 123 releases the holding of the shutter mechanism 150 through mechanical engagement (a first operation of the shutter driving mechanism 123).

After the elapse of a time T33 from the start of counting by a timer E (S103), the system control circuit 50 applies current to the lens motor 340 (S104). The time T33 is an stop standby time set to allow for a margin to ensure that rush current in starting the sequence motor 121 does not coincide with rush current in starting the lens motor 340. The rotation of the lens motor 340 causes the lens driving mechanism 330 to narrow the stop 320 from an open position to the stop position according to the set aperture value (a first operation of the stop mechanism).

When the operation with the sequence motor 121 is completed, a sequence switch, not shown, is changed to ON. After the system control circuit 50 checks the ON state of the sequence switch (SLOS), it once stops the sequence motor 121. On the other hand, the system control circuit 50 causes a timer A to start counting (S106). When the count of the timer A reaches a time T11, the system control circuit 50 determines that the bound after the collision of the mirror 130 with a stopper (not shown) completely stops, and finishes the current application to the front curtain magnet 152. This causes the front curtain 151 to start traveling with the urging force of the spring, not shown, to start opening the shutter 150. The system control circuit 50 starts accumulation of charge on the image-pickup device 14 (S108).

Next, the system control circuit 50 monitors the count value of a timer B to wait for the elapse of an exposure time T66 set to a predetermined value (S109). After the elapse of the exposure time, the system control circuit 50 stops the current application to the rear curtain magnet 157 (S110). This causes the rear curtain 156 to start traveling following the front curtain 151.

The system control circuit 50 monitors the count of a timer C. After the elapse of a time T22 (S111), it starts applying current to the sequence motor 121 (S112) to start the rotation of the sequence motor 121 again. The sequence motor 121 is again rotated to cause the mirror driving mechanism 122 to move the mirror 130 to the down position from the up position (a second operation of the mirror driving mechanism 122). For the mirror driving mechanism 122, it is possible to use a mechanism which directly drives the mirror 130 with the sequence motor 121 or a mechanism which drives the mirror 130 through the urging force of a spring after the sequence motor 121 releases the engagement of an engagement member, not shown. The time T22 is a charge standby time set to allow for a margin to ensure that the travel of the rear curtain is completed before the mirror starts moving down.

The shutter driving mechanism 123 returns the front curtain 151 and the rear curtain 156 to the position before their travels to hold them through mechanism engagement (a shutter charge operation or a second operation of the shutter driving mechanism 123).

With the control as described above, the start of current application to the sequence motor 121 (the start of the driving of the sequence motor 121) for preparatory driving (a second operation) for the next image-taking is performed after the start of the traveling of the rear curtain and before the end of the traveling of the rear curtain during the accumulation of charge on the image-pickup device 14. In the stage of the "shutter slit" in FIG. 3, a diagonal line F on the left represents the movement of the front curtain from the start to end of the traveling, while a diagonal line R on the right represents the movement of the rear curtain from the start to end of the traveling.

Even when the current application to the sequence motor 121 is started after the start of the travel of the rear curtain (during the exposure), appropriate exposure is not interfered since the charge standby time T22 is provided to prevent the downward operation of the mirror from outrunning the travel of the rear curtain. Since a time lag is present in terms of mechanism between the start of the current application to the sequence motor 121 and the start of the downward movement of the mirror, the current application to the sequence motor 121 can be started without waiting for the completion of the rear curtain travel.

In addition, if a margin such as the abovementioned time lag is present, the current application to the sequence motor 121 for moving the mirror down can be started simultaneously with the start of the rear curtain travel. Thus, no noise is produced in association with the start of the sequence motor 121 during reading of charge from the image-pickup device as in the conventional camera, thereby making it possible to provide excellent taken images. It is also possible to reliably prevent such a conflict in the image-taking sequence as the mirror 130 starting to move toward the down position before the completion of the travel of the rear curtain 156 of the shutter 150 to cause vignetting in the luminous flux which forms a subject image.

In addition, the order (timing) of the preparatory driving and the standby time before the start of motor driving for the preparatory driving can be appropriately set to establish an nonconflicting image-taking sequence with the shortest required time which allows for a difference in time necessary for the preparatory operation between the respective driving mechanisms and the unstable mechanical operations of the respective driving mechanisms.

Next, the system control circuit 50 monitors the count value of a timer E. After the elapse of a time T33, it applies current to the lens motor 340 (S114) to cause the lens driving mechanism 330 to return the stop 320 to the open position (a second operation of the stop mechanism) in order to increase the accuracy of the photometric operation and AF operation.

Then, the system control circuit 50 monitors the count value of a timer D (S115). After the elapse of a time T55, it provides the image-pickup device 14 with a driving pulse for charge reading to start reading charge (S116). The time T55 is set to allow for a margin to ensure that the shutter 150 can control the amount of light reaching the image-pickup device 14. In this manner, the current application to the sequence motor 121 and the lens motor 340 is started during the accumulation of charge on the image-pickup device 14 to perform preparatory driving.

In Embodiment 1, the following condition is satisfied:

accumulation time T55>exposure time T66+charge standby time T22+stop standby time T33 in order to reliably start applying current to the sequence motor 121 and the lens motor 340 during the accumulation of charge on the image-pickup device 14.

If the sufficient margin is ensured, the count values of the timers for the charge standby time T22 and the stop standby time T33 may be set to zero.

When the preparatory driving with the sequence motor 121 is completed, the sequence switch is changed to ON. After the system control circuit 50 checks the ON state of the sequence switch (S117), it stops the sequence motor 121 (S118).

Next, the system control circuit 50 monitors the count value of a timer F. After the elapse of a time T44 (S119), it determines whether or not the release switch 183 is fully pressed (S120). When the fully pressed state of the release switch 183 is already released, the system control circuit 50 ends the image-taking operation. On the other hand, when the release switch 183 is fully pressed, the system control circuit 50 returns to the operation at step S102 to repeat the series of image-taking operations as described above for the next image-taking operation (continuous image-taking operation).

As described above, according to Embodiment 1, since the motor driving is started for the preparatory driving during the charge accumulation on the image-pickup device 14, the time taken for one image-taking operation can be reduced as compared with the case where the motor driving is started for preparatory driving after or during the charge reading while degraded images due to the driving of the actuator during the charge reading can be avoided. Thus, the speed of continuous image-taking can be increased.

Embodiment 1 has been described of the case where the driving of the motor (actuator) is started for the preparatory driving of the respective driving mechanisms during the charge accumulation on the image-pickup device. In other words, it is equivalent to the start of the motor driving for the preparatory driving before the charge reading from the image-pickup device. In addition, when the charge accumulation on the image-pickup device is finished almost simultaneously with the completion of the exposure and some standby time is set before the charge is read, the actuator driving can be started for the preparatory driving during that standby time, or during the exposure of the image-pickup device if such a standby time is not set. In this case, similarly, excellent images can be provided as compared with the case where the preparatory driving is started during the charge reading.

This application claims foreign priority benefits based on Japanese Patent Application No. 2004-229876, filed on Aug. 5, 2004, which is hereby incorporated by reference herein in its entirety as if fully set forth herein.

What is claimed is:

1. An image-taking apparatus which takes images with a photoelectrical conversion device, comprising:
   a controller which controls an actuator which drives an operation mechanism that performs a first operation for allowing the image-taking and then a second operation for returning to the state before the first operation; and
   a shutter which controls an amount of exposure light applied to the photoelectrical conversion element by travel of a front curtain and a rear curtain,
   wherein the controller starts driving the actuator for causing the operation mechanism to perform the second operation after the start of the travel of the rear curtain and before the end thereof during accumulation of charge on the photoelectrical conversion device.

2. The image-taking apparatus according to claim 1, wherein the operation mechanism is a mirror driving mechanism which drives a mirror member which is moved relative to an optical path to the photoelectrical conversion device,
   the first operation is an operation of moving the mirror member out of the optical path from on the optical path, and
   the second operation is an operation of moving the mirror member onto the optical path from outside the optical path.

3. The image-taking apparatus according to claim 1, wherein the operation mechanism is a shutter driving mechanism which holds the shutter in a charge state,
   the first operation is an operation of releasing the holding of the shutter in the charge state, and
   the second operation is an operation of charging and holding the shutter.

4. The image-taking apparatus according to claim 3, wherein the controller starts driving the actuator for causing the shutter driving mechanism to perform the second operation after the elapse of a predetermined time period from start of travel of the rear curtain.

5. The image-taking apparatus according to claim 1, wherein the operation mechanism is a stop mechanism which has a stop member which adjusts an amount of light, and
   the first operation is an operation of narrowing the stop member and the second operation is an operation of opening the stop member.

6. The image-taking apparatus according to claim 1, wherein the controller controls a first actuator which drives a first operation mechanism that includes a mirror member moved relative to an optical path to the photoelectrical conversion device and the shutter, and a second actuator which drives a second operation mechanism that includes a stop member adjusting an amount of light, and
   the controller starts driving the second actuator for causing the second operation mechanism to perform the second operation after the elapse of a predetermined time period from start of driving of the first actuator for causing the first operation mechanism to perform the second operation.

7. The image-taking apparatus according to claim 1, comprising:
   the operation mechanism; and
   the actuator.

8. The image-taking apparatus according to claim 1, wherein an interchangeable lens unit which has the operation mechanism and the actuator is mountable on the image-taking apparatus.

9. An image-taking apparatus which takes images with a photoelectrical conversion device, comprising:
   a controller which controls an actuator which drives an operation mechanism which performs a first operation for allowing the image-taking and then a second operation for returning to the state before the first operation,
   wherein the controller starts driving the actuator for causing the operation mechanism to perform the second operation before reading of charge from the photoelectrical conversion device.

10. The image-taking apparatus according to claim 9, further comprising a shutter which controls an amount of exposure light applied to the photoelectrical conversion element by travel of a front curtain and a rear curtain,
    wherein the controller starts driving the actuator for causing the operation mechanism to perform the second operation after the rear curtain starts traveling.

11. The image-taking apparatus according to claim 9, wherein the operation mechanism is a mirror driving mechanism which drives a mirror member which is moved relative to an optical path to the photoelectrical conversion device,
    the first operation is an operation of moving the mirror member out of the optical path from on the optical path, and
    the second operation is an operation of moving the mirror member onto the optical path from outside the optical path.

12. The image-taking apparatus according to claim 9, wherein the operation mechanism is a shutter driving mechanism which holds a shutter which controls an amount of exposure light applied to the photoelectrical conversion device in a charge state,
    the first operation is an operation of releasing the holding of the shutter in the charge state, and
    the second operation is an operation of charging and holding the shutter.

13. The image-taking apparatus according to claim 12, wherein the shutter driving mechanism has a front curtain and a rear curtain, and
    the controller starts driving the actuator for causing the shutter driving mechanism to perform the second operation after the elapse of a predetermined time period from start of travel of the rear curtain.

14. The image-taking apparatus according to claim 9, wherein the operation mechanism is a stop mechanism which has a stop member which adjusts an amount of light, and the first operation is an operation of narrowing the stop member and the second operation is an operation of opening the stop member.

15. The image-taking apparatus according to claim 9, wherein the controller controls a first actuator which drives a first operation mechanism that includes a mirror member moved relative to an optical path to the photoelectrical conversion device and a shutter controlling an amount of exposure light applied to the photoelectrical conversion device, and a second actuator which drives a second operation mechanism that includes a stop member adjusting an amount of light, and the controller starts driving the second actuator for causing the second operation mechanism to perform the second operation after the elapse of a predetermined time period from start of driving of the first actuator for causing the first operation mechanism to perform the second operation.

16. The image-taking apparatus according to claim 9, comprising: the operation mechanism; and the actuator.

17. The image-taking apparatus according to claim 9, wherein an interchangeable lens unit which has the operation mechanism and the actuator is mountable on the image-taking apparatus.

* * * * *